US010171222B2

United States Patent
Xu et al.

(10) Patent No.: US 10,171,222 B2
(45) Date of Patent: Jan. 1, 2019

(54) METHOD FOR CONFIGURING CQI MEASUREMENT SUBFRAME, BASE STATION, AND USER EQUIPMENT

(71) Applicant: Huawei Technologies Co., Ltd., Shenzhen (CN)

(72) Inventors: Li Xu, Chengdu (CN); Yun Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 15/280,401

(22) Filed: Sep. 29, 2016

(65) Prior Publication Data
US 2017/0019233 A1 Jan. 19, 2017

Related U.S. Application Data

(63) Continuation of application No. PCT/CN2014/074417, filed on Mar. 31, 2014.

(51) Int. Cl.
*H04W 48/12* (2009.01)
*H04L 5/00* (2006.01)
(Continued)

(52) U.S. Cl.
CPC .......... *H04L 5/0057* (2013.01); *H04L 5/0048* (2013.01); *H04L 5/0073* (2013.01);
(Continued)

(58) Field of Classification Search
CPC ..................................................... H04W 48/12
(Continued)

(56) References Cited

U.S. PATENT DOCUMENTS

2013/0194940 A1 8/2013 Li et al.
2015/0131584 A1 5/2015 Li et al.

FOREIGN PATENT DOCUMENTS

CN 102026209 A 4/2011
CN 102143499 A 8/2011
(Continued)

OTHER PUBLICATIONS

Qualcomm Incorporated et al. "UE behavior—for CRS-IC under signaling," 3GPP TSG-RAN WG4 #67 R4-132200, dated May 13, 2013, Fukuoka, Japan, 11 pages.
(Continued)

*Primary Examiner* — Shripal K Khajuria
(74) *Attorney, Agent, or Firm* — Leydig, Voit & Mayer, Ltd.

(57) ABSTRACT

A method, a base station, and user equipment are provided for configuring a CQI measurement subframe. The method includes: receiving an interference neighboring cell identifier of user equipment UE sent by the UE, obtaining almost blank subframe ABS configuration information according to the interference neighboring cell identifier of the UE, where the ABS configuration information is an ABS configuration of an interference neighboring cell corresponding to the interference neighboring cell identifier, configuring an ABS measurement subframe and a NonABS measurement subframe for the UE according to the ABS configuration information of the interference neighboring cell of the UE, and sending the ABS measurement subframe and the NonABS measurement subframe to the UE where the ABS measurement subframe is used by the UE to perform first CQI measurement and the NonABS measurement subframe is used by the UE to perform second CQI measurement.

19 Claims, 5 Drawing Sheets

(51) Int. Cl.
*H04W 24/10* (2009.01)
*H04W 72/08* (2009.01)
*H04W 92/10* (2009.01)

(52) U.S. Cl.
CPC ........... *H04W 24/10* (2013.01); *H04W 48/12* (2013.01); *H04W 72/082* (2013.01); *H04W 92/10* (2013.01)

(58) Field of Classification Search
USPC ......................................................... 370/329
See application file for complete search history.

(56) References Cited

FOREIGN PATENT DOCUMENTS

| | | | |
|---|---|---|---|
| CN | 103037399 | A | 4/2013 |
| EP | 2683191 | A1 | 1/2014 |
| EP | 2683192 | A1 | 1/2014 |
| WO | 2014015504 | A1 | 1/2014 |

OTHER PUBLICATIONS

Extended European Search Report in connection with corresponding EP Application No. 14888125, dated Feb. 21, 2017, 9 pages.
International Search Report (including English translation) issued in corresponding PCT Application No. PCT/CN2014/074417, dated Dec. 30, 2014, 13 pages.

METHOD FOR CONFIGURING CQI MEASUREMENT SUBFRAME, BASE STATION, AND USER EQUIPMENT

CROSS-REFERENCE TO RELATED APPLICATION

This application is a continuation of International Application No. PCT/CN2014/074417, filed on Mar. 31, 2014, which is hereby incorporated by reference in its entirety.

TECHNICAL FIELD

The present disclosure relates to the communications field, and in particular, to a method for configuring a channel quality indicator (CQI) measurement subframe, a base station, and user equipment.

BACKGROUND

A heterogeneous network (HetNet) is formed by adding some low power nodes (LPN) within a deployment scope of a macro base station. The HetNet can improve a system capacity and meet a capacity requirement of a Long Term Evolution (LTE) technology. A base station in an LTE system is an evolved NodeB (eNB), and a low power node may be a micro base station (Pico eNB), a cell covered by the micro base station is referred to as a micro cell (Pico cell), and a cell covered by a macro base station (Macro eNB) is referred to as a macro cell (Macro cell).

SUMMARY

Embodiments of the present disclosure provide a method for configuring a CQI measurement subframe, a base station, and user equipment, to improve CQI measurement accuracy of UE, and improve a cell throughput.

According to a first aspect, a base station is provided. The base station may include a transceiver and a processor, where the transceiver is configured to receive an interference neighboring cell identifier of user equipment (UE) sent by the UE, the processor is configured to obtain almost blank subframe (ABS) configuration information according to the interference neighboring cell identifier of the UE where the ABS configuration information is an ABS configuration of an interference neighboring cell corresponding to the interference neighboring cell identifier, the processor is configured to configure an ABS measurement subframe and a NonABS measurement subframe for the UE according to the ABS configuration information, and the transceiver is configured to send the ABS measurement subframe and the NonABS measurement subframe to the UE where the ABS measurement subframe is used by the UE to perform first channel quality indicator (CQI) measurement and the NonABS measurement subframe is used by the UE to perform second CQI measurement.

According to a second aspect, an embodiment of the present disclosure provides a method for configuring a CQI measurement subframe. The method may include: receiving an interference neighboring cell identifier of user equipment (UE) sent by the UE, obtaining almost blank subframe (ABS) configuration information according to the interference neighboring cell identifier of the UE, where the ABS configuration information may be an ABS configuration of an interference neighboring cell corresponding to the interference neighboring cell identifier, configuring an ABS measurement subframe and a NonABS measurement subframe for the UE according to the ABS configuration information of the interference neighboring cell of the UE, and sending the ABS measurement subframe and the NonABS measurement subframe to the UE where the ABS measurement subframe may be used by the UE to perform first CQI measurement and the NonABS measurement subframe is used by the UE to perform second CQI measurement.

It should be understood that both the foregoing general description and the following detailed description are exemplary and explanatory only and are not restrictive of the disclosure.

BRIEF DESCRIPTION OF DRAWINGS

To describe the technical solutions in the embodiments of the present disclosure t more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present application. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The technical solutions provided in the embodiments of the present disclosure may be applied to various wireless communications networks, for example, a Long Term Evolution (LTE) system and a Long Term Evolution Advanced (LTE-A) system. The terms "network" and "system" may be interchanged.

Figure 1:
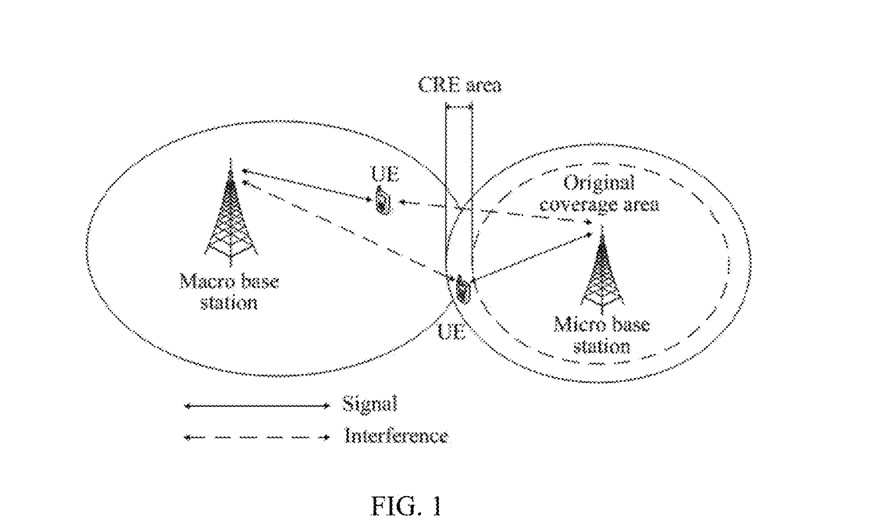
FIG. 1 is a schematic diagram of a CRE technical principle according to an embodiment of the present disclosure.

For a HetNet deployed in a same frequency, to make more user equipment (UE) preferentially camp on and hand over to the micro base station from the macro base station, a cell range expansion (CRE) technology may be used, that is, a transmit power of the micro base station is not changed, and an offset is added to a corresponding threshold by configuring cell selection and handover parameters, to make the UE preferentially camp on and hand over to the micro base station. Referring to FIG. 1, FIG. 1 is a schematic diagram of a CRE technical principle. Before the CRE technology is used, the micro base station is used as only a serving cell of UE located in a "micro base station original coverage area", and a serving cell of another area of the UE is a macro base station. After the CRE technology is used, the serving cell of the UE located in a "CRE area" changes from the macro base station to the micro base station.

However, in the CRE area, energy of a downlink signal of the macro base station is relatively strong, interferes with the UE that uses a micro base station as a serving cell in the CRE area, and even may make the UE work abnormally.

Figure 2:
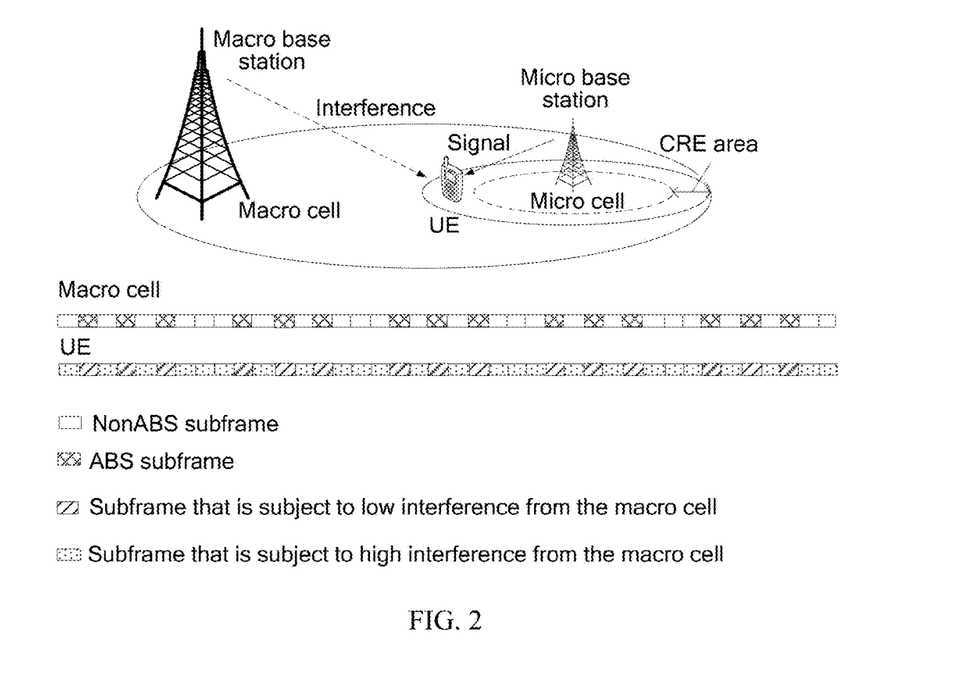
FIG. 2 is a schematic diagram of a TDM eICIC technical principle according to an embodiment of the present disclosure.

By means of a time-domain enhanced inter-cell inference coordination (TDM eICIC) technology, the Macro cell does not perform scheduling in an almost blank subframe (ABS), and the Pico cell in a corresponding ABS subframe schedules the UE located in the CRE area. The Macro cell performs scheduling in a non-almost blank subframe (Non-ABS), and the Pico cell in a corresponding NonABS subframe does not schedule the UE located in the CRE area. As shown in FIG. 2, because the Macro cell does not send a signal in the ABS subframe, the UE, of the Pico cell, located in the CRE area does not receive any interference from the Macro cell, and can work normally.

Interference received by the UE located in the CRE area in the ABS subframe is different from interference received by the UE located in the CRE area in NonABS. A channel quality indicator (CQI) of the UE measured in the ABS subframe is different from a CQI of the UE, measured in the NonABS subframe. When an ABS measurement subframe and a NonABS measurement subframe that correspond to UE are not properly configured, channel quality reported by the UE does not match actual channel quality, causing an increase in a system bit error rate, and further causing a decrease in a system throughput.

The embodiments of the present disclosure provide a method for configuring a CQI measurement subframe, a base station, and user equipment, where an interference neighboring cell identifier of UE sent by the UE is received; almost blank subframe (ABS) configuration information is obtained according to the interference neighboring cell identifier of the UE, where the ABS configuration information is an ABS configuration of an interference neighboring cell corresponding to the interference neighboring cell identifier; an ABS measurement subframe and a NonABS measurement subframe are configured for the UE according to the ABS configuration information; and the ABS measurement subframe and the NonABS measurement subframe are sent to the UE, so that the UE performs first CQI measurement according to the ABS measurement subframe and performs second CQI measurement according to the NonABS measurement subframe, which avoids a case in which when an ABS measurement subframe and a NonABS measurement subframe that correspond to UE are not properly configured, channel quality reported by the UE does not match actual channel quality, causing an increase in a system bit error rate, and further causing a decrease in a system throughput.

In the embodiments of the present disclosure, a base station (BS) may be a device in communication with user equipment (UE) or another communications site such as a repeater site, and the base station may provide communications coverage of a specific physical area. For example, the base station may be specifically an evolved NodeB (ENB or eNodeB) in LTE or LTE-A, or may be another access network device providing an access service in a wireless communications network, which is not limited in the present disclosure.

In the embodiments of the present disclosure, the UE may be distributed in an entire wireless network, and each UE may be static or mobile. The UE may be referred to as a terminal (terminal), a mobile station (mobile station), a subscriber unit (subscriber unit), a station (station), or the like. The UE may be a cellular phone (cellular phone), a personal digital assistant (PDA), a wireless modem (modem), a wireless communications device, a handheld device (handheld), a laptop computer (laptop computer), or the like. When the UE is applied to M2M manner communication, the UE may be referred to as an M2M terminal, and may be specifically a smart meter or a smart appliance that supports M2M communication, or the like.

In a scenario shown in FIG. 2, ABS configuration information of a Macro eNB is statically configured on a Pico eNB. The Pico eNB configures an ABS measurement subframe and a NonABS measurement subframe for UE according to the ABS configuration information of the Macro eNB. The ABS measurement subframe of the UE is consistent with an ABS configuration of the Macro eNB, and the NonABS measurement subframe of the UE is consistent with a NonABS configuration of the Macro eNB. The UE separately performs CQI measurement on the ABS measurement subframe and the NonABS measurement subframe and sends a report. The Pico eNB separately applies CQI measurement results in the ABS measurement subframe and the NonABS measurement subframe to an ABS subframe and a NonABS subframe.

However, in an actual network, a status of interference received by the UE changes, or the UE may receive multiple pieces of interference. If a base station to which a cell, in which the UE is located, belongs cannot correctly obtain interference information of the UE, and cannot properly configure the ABS measurement subframe and the NonABS measurement subframe that correspond to the UE, resulting in that channel quality reported by the UE does not match actual quality, causing an increase in a system bit error rate, and further causing a decrease in a system throughput.

Embodiment 1

Figure 3:
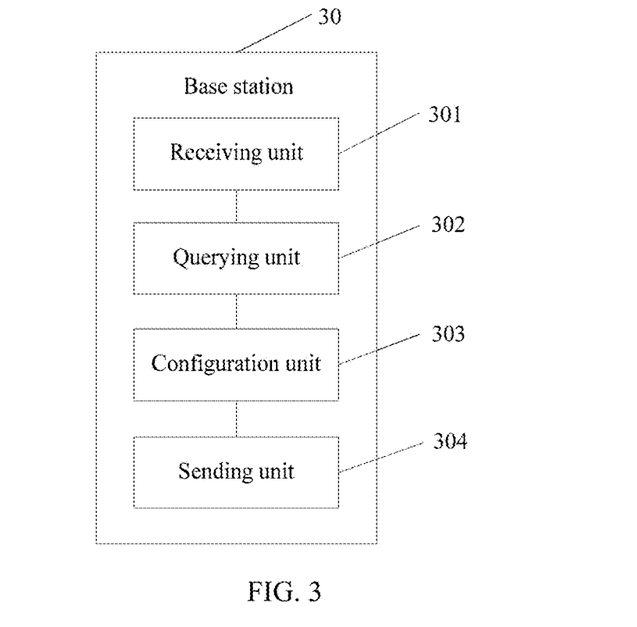
FIG. 3 is an apparatus structural diagram of a base station according to an embodiment of the present disclosure.

This embodiment of the present disclosure provides a base station 30. Referring to FIG. 3, the base station 30 includes: a receiving unit 301, a querying unit 302, a configuration unit 303, and a sending unit 304.

The receiving unit 301 is configured to receive an interference neighboring cell identifier of UE sent by the UE.

The UE may be UE at an edge of a serving cell of a base station, the UE may obtain the interference neighboring cell identifier of the UE by means of A3 measurement, and the UE may send the interference neighboring cell identifier of the UE to the base station in a form of reporting an A3 measurement report.

There may be one or more interference neighboring cell identifiers sent by the UE, and a specific quantity is determined according to a measurement result of an interference neighboring cell of the UE.

Exemplarily, the UE may preset a threshold, and if a result obtained by means of A3 measurement performed by the UE on a first neighboring cell is greater than the threshold, the UE uses the first neighboring cell as an interference cell, and sends an identifier of the first neighboring cell to the base station.

Alternatively, the UE may send a result obtained by means of A3 measurement performed on each neighboring cell and an neighboring cell identifier to the base station in a form of a list, the base station presets a threshold, and the base station selects an neighboring cell identifier that is greater than the threshold from the list sent by the UE, as the interference neighboring cell identifier of the UE.

Certainly, the foregoing manners are only two implementable manners, which do not affect implementation of an objective of the present disclosure, and also constitute no limitation to this embodiment of the present disclosure.

The querying unit 302 is configured to obtain ABS configuration information according to the interference neighboring cell identifier of the UE received by the receiving unit 301, where the ABS configuration information is an ABS configuration of an interference neighboring cell corresponding to the interference neighboring cell identifier.

The base station 30 may prestore ABS configuration information of a neighboring cell, the ABS configuration information of the neighboring cell may be sent to the base station 30 by using an X2 interface, and the base station 30 queries for and obtains the ABS configuration information of the interference neighboring cell corresponding to the interference neighboring cell identifier according to the interference neighboring cell identifier of the UE received by the receiving unit 301.

Optionally, the base station 30 may obtain, according to the interference neighboring cell identifier of the UE received by the receiving unit 301, by means of an X2 interface message exchange, the ABS configuration information of the interference neighboring cell from a base station to which the interference neighboring cell corresponding to the interference neighboring cell identifier belongs.

The ABS configuration information may be in a form of a table or another form, which is not limited in this embodiment of the present disclosure. For example, referring to Table 1, Table 1 is ABS configuration information in a form of a table.

TABLE 1

| Neighboring cell identifier | ABS configuration |
|---|---|
| Neighboring cell 1 | 1000000000100000000010000000001000000000 |
| Neighboring cell 2 | 1000010000100001000010000100001000010000 |
| Neighboring cell 3 | 1000010000100001000010000100001000010000 |

The ABS configuration is a periodic configuration. ABS configurations are the same in each period (as specified in a protocol, a period of the ABS configuration is generally 40 ms). An ABS configuration in only one period is used as an example for description in Table 1. Each bit in the ABS configuration separately represents a time period of 1 ms, and is used to indicate a subframe type in the time period (1 ms). "1" in the ABS configuration represents an ABS subframe, and "0" represents a NonABS subframe.

Certainly, the foregoing ABS configuration is described only by using the period 40 ms as an example, which constitutes no limitation to this embodiment of the present disclosure. If the period of the ABS configuration specified in the protocol changes, the period can also be applied to this embodiment of the present disclosure.

The querying unit 302 may obtain an ABS configuration of each interference neighboring cell of the UE according to the interference neighboring cell identifier of the UE received by the receiving unit 301. For example, if the interference neighboring cell identifier of the UE is the neighboring cell 1, an ABS configuration of the neighboring cell 1 obtained by the querying unit 302 is 1000000000100000000010000000001000000000. For another example, if interference neighboring cell identifiers of the UE are the neighboring cell 1 and the neighboring cell 2, an ABS configuration of the neighboring cell 1 obtained by the querying unit 302 is 1000000000100000000010000000001000000000, and an ABS configuration of the neighboring cell 2 is 1000010000100001000010000100001000010000.

The configuration unit 303 is configured to configure an ABS measurement subframe and a NonABS measurement subframe for the UE according to the ABS configuration obtained by the querying unit 302.

Optionally, if there is one interference neighboring cell of the UE, the configuration unit 303 is specifically configured to configure the ABS measurement subframe according to ABS subframe configuration information of the interference neighboring cell of the UE, and configure the NonABS measurement subframe according to NonABS subframe configuration information of the interference neighboring cell of the UE.

For example, if there is only one interference neighboring cell identifier of the UE received by the receiving unit 301, which is the neighboring cell 1, ABS configuration information of the neighboring cell 1 obtained by the querying unit 302 is 1000000000100000000010000000001000000000. The configuration unit 303 configures the ABS measurement subframe and the NonABS measurement subframe for the UE according to the foregoing ABS configuration information. Because only one interference neighboring cell exists, the ABS measurement subframe configured for the UE is: 1000000000100000000010000000001000000000, and the NonABS measurement subframe configured for the UE is: 0111111111011111111101111111110111111111, where in the ABS measurement subframe/NonABS measurement subframe, "1" represents performing CQI measurement, and "0" represents not performing CQI measurement.

Optionally, if there are at least two interference neighboring cells of the UE, the configuration unit 303 is specifically configured to configure the ABS measurement subframe according to intersection configuration information of ABS subframes of the foregoing at least two interference neighboring cells of the UE, and configure the NonABS measurement subframe according to intersection configuration information of NonABS subframes of the foregoing at least two interference neighboring cells of the UE.

For example, if there are two interference neighboring cell identifiers of the UE received by the receiving unit 301, which are separately the neighboring cell 1 and the neighboring cell 2, the ABS configuration of the neighboring cell 1 obtained by the querying unit 302 is 1000000000100000000010000000001000000000, and the ABS configuration of the neighboring cell 2 is 1000010000100001000010000100001000010000. An intersection of ABS subframes of the neighboring cell 1 and the neighboring cell 2 obtained by the configuration unit 303 is 1000000000100000000010000000001000000000 (where when ABS configurations of both the cell 1 and the cell 2 in a same subframe is 1, the intersection of the ABS subframes in the same subframe is "1", and when the ABS configurations of the cell 1 and the cell 2 in the same subframe are not 1 at the same time, the intersection of the ABS subframes in the same subframe is "0"). An intersection of NonABS subframes is 1000010000100001000010000100001000010000 (where when NonABS configurations of both the cell 1 and the cell 2 in a same subframe are 0, the intersection of the NonABS subframes in the same subframe is 1, and when the ABS configurations of the cell 1 and the cell 2 are not 0 at the same time, the intersection of the NonABS subframes in the same subframe is 0).

The ABS measurement subframe of the UE configured by the configuration unit 303 according to the intersection of the ABS subframes of the neighboring cell 1 and the neighboring cell 2 is: 1000000000100000000010000000001000000000, and the NonABS measurement subframe of the UE configured according to the intersection of the NonABS subframes of the neighboring cell 1 and the neighboring cell 2 is: 0111101111011110111101111011110111101111. In the ABS measurement subframe/NonABS measurement subframe, "1" represents performing CQI measurement, and "0" represents not performing CQI measurement.

The sending unit 304 is configured to send the ABS measurement subframe and the NonABS measurement subframe to the UE, so that the UE performs first CQI measurement according to the ABS measurement subframe and performs second CQI measurement according to the NonABS measurement subframe.

Further, the receiving unit 301 is further configured to: receive a first CQI measurement result and a second CQI measurement result that are sent by the UE.

Figure 4:
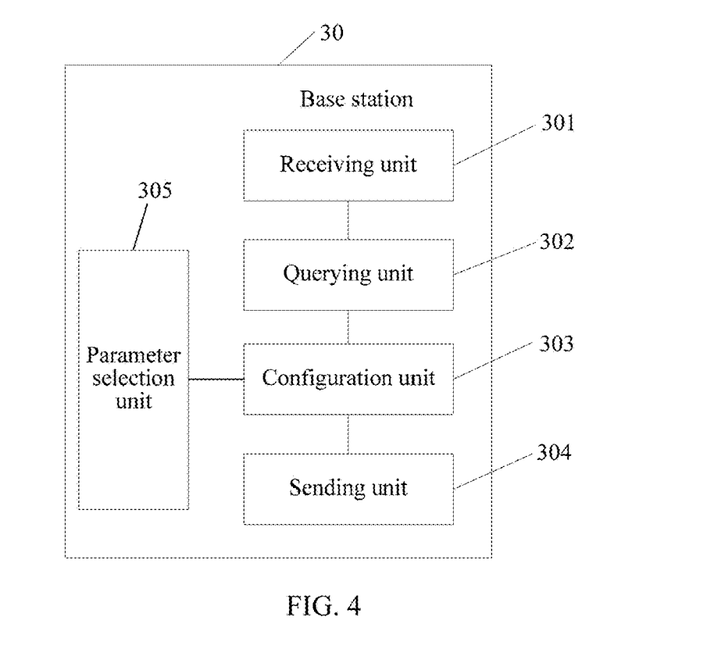
FIG. 4 is an apparatus structural diagram of another base station according to an embodiment of the present disclosure.

Further, referring to FIG. 4, the base station 30 further includes a parameter selection unit 305, configured to perform high speed physical downlink shared channel HS-PDSCH parameter selection at a location of "1" in the ABS measurement subframe according to the first CQI measurement result received by the receiving unit 301, and perform HS-PDSCH parameter selection at a location of "0" in the ABS measurement subframe according to the second CQI measurement result.

A function of the base station 30 is specifically described briefly by using four scenarios below.

Figure 5A:
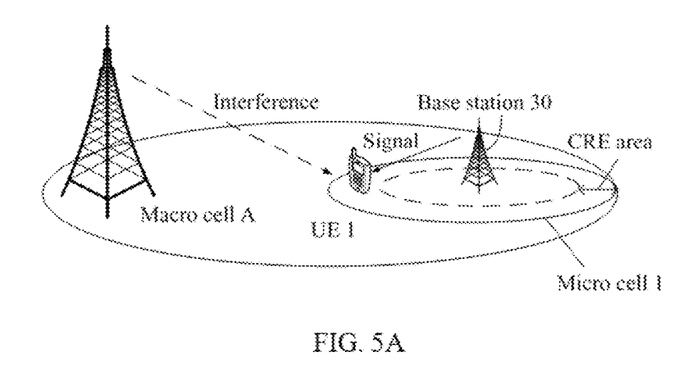
FIG. 5A is a diagram of an application scenario according to an embodiment of the present disclosure.

A First Scenario:

Referring to FIG. 5A, the base station 30 is a micro base station deployed in a macro cell A, UE is UE 1 located at an edge of a micro cell 1, and the receiving unit 301 of the base station 30 receives an interference neighboring cell identifier of the UE 1 sent by the UE 1. Assuming that there is only the macro cell A, the querying unit 302 obtains an ABS configuration of the macro cell A according to an identifier of the macro cell A. The configuration unit 303 configures an ABS subframe in the ABS configuration of the macro cell A as an ABS measurement subframe, and configures a NonABS subframe as a NonABS measurement subframe. The sending unit 304 sends the ABS measurement subframe and the NonABS measurement subframe that are configured by the configuration unit 303 to the UE 1, so that the UE 1 performs first CQI measurement at a location of the ABS measurement subframe, and performs second CQI measurement at a location of the NonABS measurement subframe.

Figure 5B:
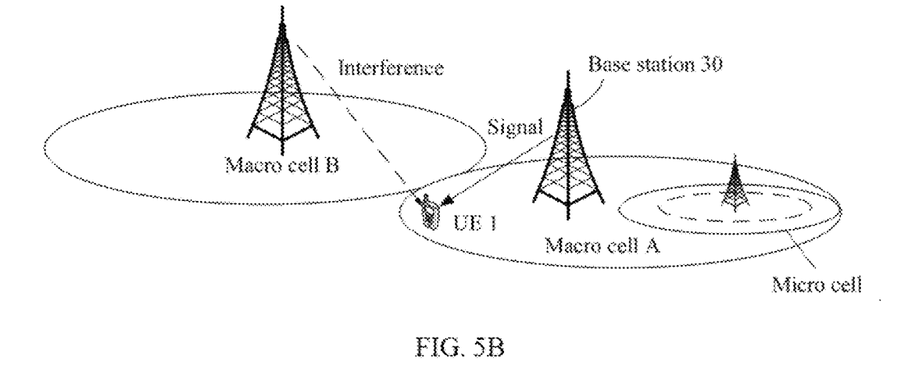
FIG. 5B is a diagram of another application scenario according to an embodiment of the present disclosure.

A Second Scenario:

Referring to FIG. 5B, the base station 30 is a macro base station deployed in a macro cell A, UE is UE 1 located at an edge of the macro cell A, and the receiving unit 301 of the base station 30 receives an interference neighboring cell identifier of the UE 1 sent by the UE 1. Assuming that there is only a macro cell B, the querying unit 302 obtains an ABS configuration of the macro cell B according to an identifier of the macro cell B. The configuration unit 303 configures an ABS subframe in the ABS configuration of the macro cell B as an ABS measurement subframe, and configures a NonABS subframe as a NonABS measurement subframe. The sending unit 304 sends the ABS measurement subframe and the NonABS measurement subframe that are configured by the configuration unit 303 to the UE 1, so that the UE 1 performs first CQI measurement at a location of ABS measurement, and performs second CQI measurement at a location of the NonABS measurement subframe.

Figure 5C:
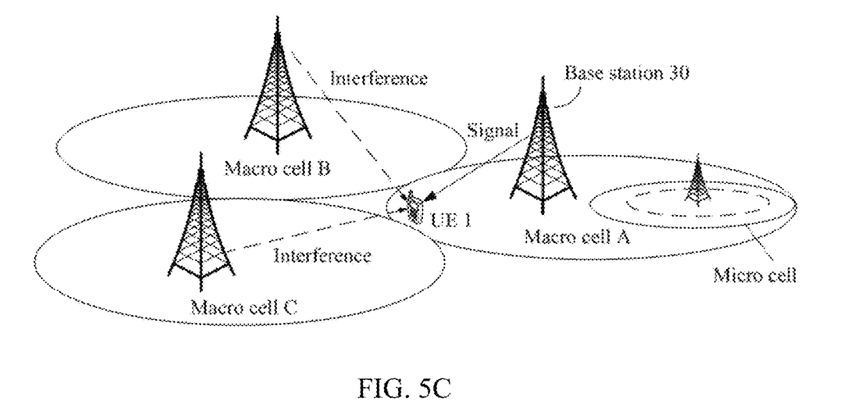
FIG. 5C is a diagram of still another application scenario according to an embodiment of the present disclosure.

A Third Scenario:

Referring to FIG. 5C, the base station 30 is a macro base station deployed in a macro cell A, UE is UE 1 located at an edge of the macro cell A, and the receiving unit 301 of the base station 30 receives an interference neighboring cell identifier of the UE 1 sent by the UE 1. Assuming that there is a macro cell B and a macro cell C, the querying unit 302 obtains ABS configurations of the macro cell B and the macro cell C according to identifiers of the macro cell B and the macro cell C. The configuration unit 303 configures intersections of ABS subframes in the ABS configurations of the macro cell B and the macro cell C to ABS measurement subframes, and configures intersections of NonABS subframes to NonABS measurement subframes. The sending unit 304 sends the ABS measurement subframes and the NonABS measurement subframes that are configured by the configuration unit 303 to the UE 1, so that the UE 1 performs first CQI measurement at a location of the ABS measurement subframe, and performs second CQI measurement at a location of the NonABS measurement subframe.

Figure 5D:
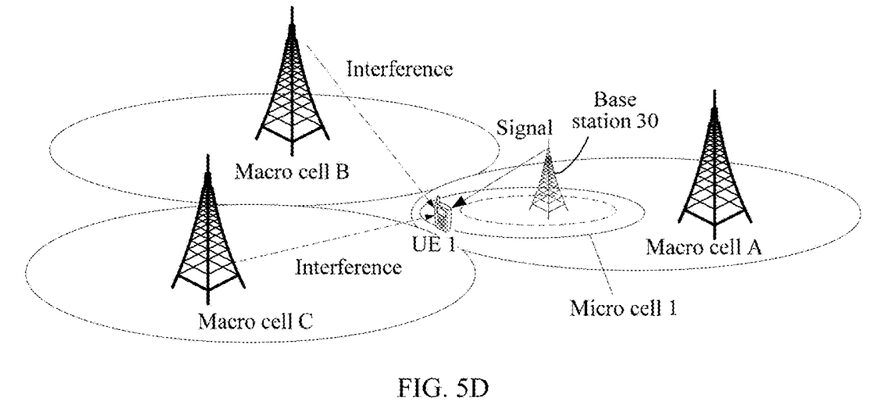
FIG. 5D is a diagram of yet another application scenario according to an embodiment of the present disclosure.

A Fourth Scenario:

Referring to FIG. 5D, the base station 30 is a micro base station deployed in a macro cell A, UE is UE 1 located at an edge of the micro cell 1, and the receiving unit 301 of the base station 30 receives an interference neighboring cell identifier of the UE 1 sent by the UE 1. Assuming that there is a macro cell B and a macro cell C, the querying unit 302 obtains ABS configurations of the macro cell B and the macro cell C according to the identifiers of the macro cell B and the macro cell C. The configuration unit 303 configures intersections of ABS subframes in the ABS configurations of the macro cell B and the macro cell C to ABS measurement subframes, and configures intersections of NonABS subframes to NonABS measurement subframes. The sending unit 304 sends the ABS measurement subframes and the NonABS measurement subframes that are configured by the configuration unit 303 to the UE 1, so that the UE 1 performs first CQI measurement at a location of the ABS measurement subframe, and performs second CQI measurement at a location of the NonABS measurement subframe.

It should be noted that, the receiving unit in this embodiment may be a receiver of the base station, and the sending unit may be a transmitter of the base station. In addition, the receiving unit and the sending unit may also be integrated into a transceiver of the base station. The querying unit may be an independently disposed processor, or may be implemented by being integrated into a processor of the base station, or a function of the querying unit may be stored in a memory of the base station in a form of program code, and the foregoing function of the querying unit is invoked and performed by a processor of the base station. An implementation of the configuration unit is similar to that of the querying unit, and may be integrated together with the querying unit, or may be implemented independently. The processor herein may be a central processing unit (CPU) or an application-specific integrated circuit (ASIC), or is configured to one or more integrated circuits that implement the embodiment of the present disclosure.

The base station provided in this embodiment of the present disclosure receives an interference neighboring cell identifier of UE sent by the UE; obtains almost blank subframe ABS configuration information according to the interference neighboring cell identifier of the UE, where the ABS configuration information is an ABS configuration of an interference neighboring cell corresponding to the interference neighboring cell identifier; configures an ABS measurement subframe and a NonABS measurement subframe for the UE according to the ABS configuration information; and sends the ABS measurement subframe and the NonABS measurement subframe to the UE, so that the UE performs first CQI measurement according to the ABS measurement subframe and performs second CQI measurement according to the NonABS measurement subframe, which avoids a case in which when an ABS measurement subframe and a NonABS measurement subframe that correspond to UE are not properly configured, channel quality reported by the UE does not match actual channel quality, causing an increase in a system bit error rate, and further causing a decrease in a system throughput.

Embodiment 2

Figure 6:
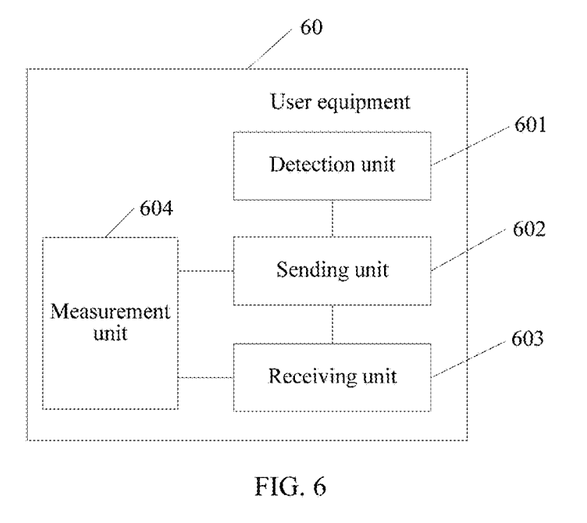
FIG. 6 is an apparatus structural diagram of user equipment according to an embodiment of the present disclosure.

This embodiment of the present disclosure provides user equipment 60. Referring to FIG. 6, the user equipment 60 includes: a detection unit 601, a sending unit 602, a receiving unit 603, and a measurement unit 604.

The detection unit 601 is configured to detect an interference neighboring cell of the user equipment UE.

The sending unit 602 is configured to send an interference neighboring cell identifier of the UE detected by the detection unit to a base station, so that the base station obtains almost blank subframe ABS configuration information according to the interference neighboring cell identifier of the UE, and the base station configures an ABS measurement subframe and a NonABS measurement subframe for the UE according to the ABS configuration information, where the ABS configuration information is an ABS configuration of the interference neighboring cell corresponding to the interference neighboring cell identifier.

The receiving unit 603 is configured to receive the ABS measurement subframe and the NonABS measurement subframe that are sent by the base station.

The measurement unit 604 is configured to perform first CQI measurement according to the ABS measurement subframe received by the receiving unit 603 and perform second CQI measurement according to the NonABS measurement subframe received by the receiving unit 603.

The detection unit 601 may obtain the interference neighboring cell identifier of the UE by means of A3 measurement.

There may be one or more interference neighboring cell identifiers of the UE, which is specifically determined according to a quantity of interference neighboring cells that interfere with the UE.

The sending unit 602 may send the interference neighboring cell identifier of the UE to the base station in a form of reporting an A3 measurement report.

Further, the sending unit 602 is further configured to:

send a first CQI measurement result and a second CQI measurement result that are obtained by means of measurement by the measurement unit to the base station.

It should be noted that, the receiving unit in this embodiment may be a receiver of the UE, and the sending unit may be a transmitter of the UE. In addition, the receiving unit and the sending unit may also be integrated into a transceiver of the UE. The detection unit may be an independently disposed processor, or may be implemented by being integrated into a processor of the UE, or a function of the detection unit may be stored in a memory of the UE in a form of program code, and the foregoing function of the detection unit is invoked and performed by a processor of the UE. An implementation of the measurement unit is similar to that of the detection unit, and may be integrated together with the detection unit, or may be implemented independently. The processor herein may be a central processing unit (CPU) or an application-specific integrated circuit (ASIC), or is configured to one or more integrated circuits that implement the embodiment of the present disclosure.

The user equipment provided in this embodiment of the present disclosure detects an interference neighboring cell of the UE; sends an interference neighboring cell identifier of the UE detected by the detection unit to the base station, so that the base station obtains almost blank subframe ABS configuration information according to the interference neighboring cell identifier of the UE, and the base station configures an ABS measurement subframe and a NonABS measurement subframe for the UE according to the ABS configuration information, where the ABS configuration information is an ABS configuration of the interference neighboring cell corresponding to the interference neighboring cell identifier; receives the ABS measurement subframe and the NonABS measurement subframe that are sent by the base station; and performs first CQI measurement according to the ABS measurement subframe and performs second CQI measurement according to the NonABS measurement subframe, which avoids a case in which when an ABS measurement subframe and a NonABS measurement subframe that correspond to UE are not properly configured, channel quality reported by the UE does not match actual channel quality, causing an increase in a system bit error rate, and further causing a decrease in a system throughput.

Embodiment 3

Figure 7:
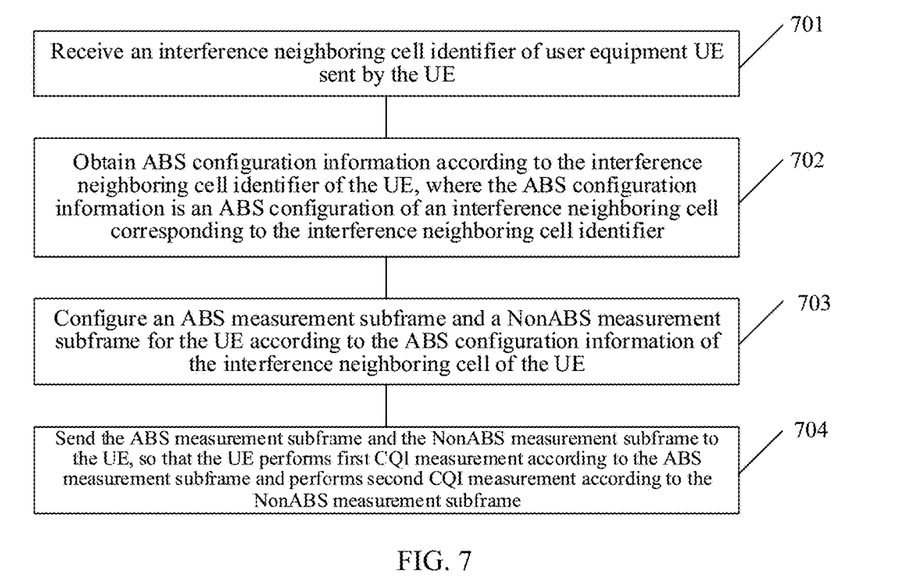
FIG. 7 is a flowchart of a method for configuring a CQI measurement subframe according to an embodiment of the present disclosure.

This embodiment of the present disclosure provides a method for configuring a channel quality indicator CQI measurement subframe. Referring to FIG. 7, the method includes:

701: Receive an interference neighboring cell identifier of user equipment UE sent by the UE.

The UE may be UE at an edge of a serving cell of a base station, the UE may obtain the interference neighboring cell identifier of the UE by means of A3 measurement, and the UE may send the interference neighboring cell identifier of the UE to the base station in a form of reporting an A3 measurement report.

There may be one or more interference neighboring cell identifiers of the UE sent by the UE, which is specifically determined according to a quantity of interference neighboring cells that interfere with the UE.

702: Obtain ABS configuration information according to the interference neighboring cell identifier of the UE, where the ABS configuration information is an ABS configuration of an interference neighboring cell corresponding to the interference neighboring cell identifier.

703: Configure an ABS measurement subframe and a NonABS measurement subframe for the UE according to the ABS configuration information of the interference neighboring cell of the UE.

704: Send the ABS measurement subframe and the NonABS measurement subframe to the UE, so that the UE performs first CQI measurement according to the ABS measurement subframe and performs second CQI measurement according to the NonABS measurement subframe.

Further, the configuring an ABS measurement subframe and a NonABS measurement subframe for the UE according to the ABS configuration information of the interference neighboring cell of the UE includes:

if there is one interference neighboring cell of the UE, configuring the ABS measurement subframe according to ABS subframe configuration information of the interference neighboring cell of the UE, and configuring the NonABS measurement subframe according to NonABS subframe configuration information of the interference neighboring cell of the UE.

Further, the configuring an ABS measurement subframe and a NonABS measurement subframe for the UE according to the ABS configuration information of the interference neighboring cell of the UE includes:

if there are at least two interference neighboring cells of the UE, configuring the ABS measurement subframe according to intersection configuration information of ABS subframes of the at least two interference neighboring cells of the UE, and configuring the NonABS measurement subframe according to intersection configuration information of NonABS subframes of the at least two interference neighboring cells of the UE.

Further, the receiving an interference neighboring cell identifier of user equipment UE sent by the UE includes:

receiving, by means of an A3 event, the interference neighboring cell identifier of the UE sent by the UE.

Further, the obtaining ABS configuration information according to the interference neighboring cell identifier of the UE includes:

querying for prestored ABS configuration information of a neighboring cell according to the interference neighboring cell identifier of the UE, and obtaining the ABS configuration information of the interference neighboring cell corresponding to the interference neighboring cell identifier; or according to the interference neighboring cell identifier of the UE, by means of an X2 interface message exchange, obtaining the ABS configuration information of the interference neighboring cell from a base station to which the interference neighboring cell corresponding to the interference neighboring cell identifier belongs.

According to the method for configuring a CQI measurement subframe provided in this embodiment of the present disclosure, an interference neighboring cell identifier of UE sent by the UE is received; almost blank subframe ABS configuration information is obtained according to the interference neighboring cell identifier of the UE, where the ABS configuration information is an ABS configuration of an interference neighboring cell corresponding to the interference neighboring cell identifier; an ABS measurement subframe and a NonABS measurement subframe are configured for the UE according to the ABS configuration information; and the ABS measurement subframe and the NonABS measurement subframe are sent to the UE, so that the UE performs first CQI measurement according to the ABS measurement subframe and performs second CQI measurement according to the NonABS measurement subframe, which avoids a case in which when an ABS measurement subframe and a NonABS measurement subframe that correspond to UE are not properly configured, channel quality reported by the UE does not match actual channel quality, causing an increase in a system bit error rate, and further causing a decrease in a system throughput.

Embodiment 4

Figure 8:
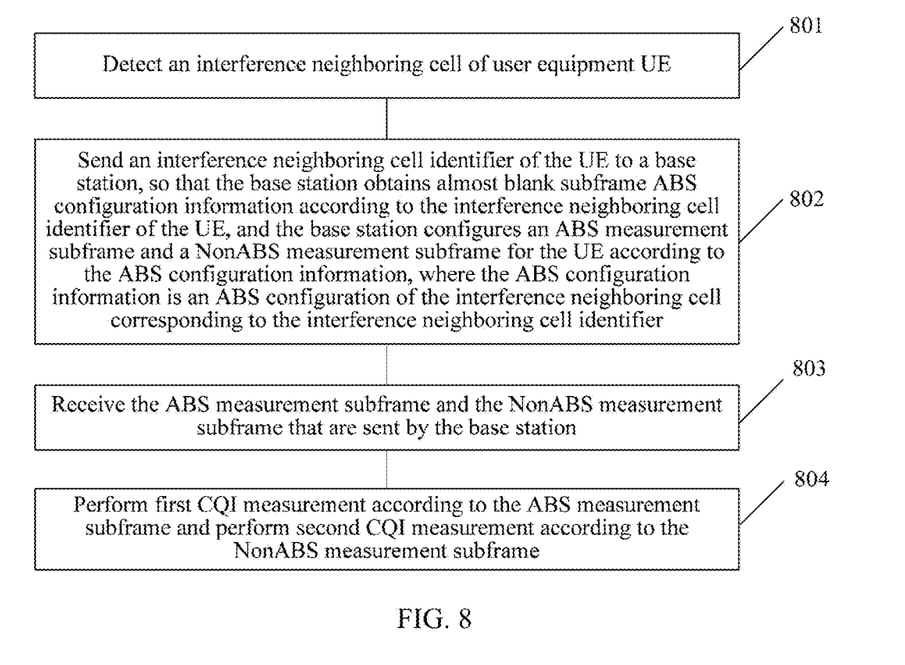
FIG. 8 is a flowchart of another method for configuring a CQI measurement subframe according to another embodiment of the present disclosure.

This embodiment of the present disclosure provides a method for configuring a CQI measurement subframe. Referring to FIG. 8, the method includes:

801: Detect an interference neighboring cell of user equipment UE.

802: Send an interference neighboring cell identifier of the UE to a base station, so that the base station obtains almost blank subframe ABS configuration information according to the interference neighboring cell identifier of the UE, and the base station configures an ABS measurement subframe and a NonABS measurement subframe for the UE according to the ABS configuration information, where the ABS configuration information is an ABS configuration of the interference neighboring cell corresponding to the interference neighboring cell identifier.

803: Receive the ABS measurement subframe and the NonABS measurement subframe that are sent by the base station.

804: Perform first CQI measurement according to the ABS measurement subframe and perform second CQI measurement according to the NonABS measurement subframe.

Further, the sending an interference neighboring cell identifier of the UE to a base station includes:

sending, by means of an A3 event, the interference neighboring cell identifier of the UE to the base station.

Further, the method further includes:

sending the first CQI measurement result and a second CQI measurement result to the base station. According to the method for configuring a CQI measurement subframe provided in this embodiment of the present disclosure, an interference neighboring cell of UE is detected; an interference neighboring cell identifier of the UE detected by the detection unit is sent to a base station, so that the base station obtains ABS configuration information according to the interference neighboring cell identifier of the UE, and the base station configures an ABS measurement subframe and a NonABS measurement subframe for the UE according to the ABS configuration information, where the ABS configuration information is an ABS configuration of the interference neighboring cell corresponding to the interference neighboring cell identifier; the ABS measurement subframe and the NonABS measurement subframe that are sent by the base station are received; first CQI measurement is performed according to the ABS measurement subframe and second CQI measurement is performed according to the NonABS measurement subframe, which avoids a case in which when an ABS measurement subframe and a NonABS measurement subframe that correspond to UE are not properly configured, channel quality reported by the UE does not match actual channel quality, causing an increase in a system bit error rate, and further causing a decrease in a system throughput.

In the present disclosure, a receiving unit may be a receiver, a querying unit may be an inquirer, a configuration unit may be a configurator, a sending unit may be a sender, a detection unit may be a detector, and a measurement unit may be a measurer. The module, sub-module, unit and sub-unit disclose herein may have at least one processor and a memory that is communicably connected with the at least one processor for storing instructions executable by the at least one processor.

A base station is provided. The base station may include a receiver to receive an interference neighboring cell identifier of user equipment (UE) sent by the UE, an inquirer to obtain almost blank subframe (ABS) configuration information according to the interference neighboring cell identifier of the UE received by the receiver, wherein the ABS configuration information is an ABS configuration of an interference neighboring cell corresponding to the interference neighboring cell identifier, a configurator to configure an ABS measurement subframe and a NonABS measurement subframe for the UE according to the ABS configuration information obtained by the inquirer, and a sender to send the ABS measurement subframe and the NonABS measurement subframe to the UE, so that the UE performs first channel quality indicator (CQI) measurement according to the ABS measurement subframe and performs second CQI measurement according to the NonABS measurement subframe.

For the base station, the configurator may be further configured to: if there is one interference neighboring cell of the UE, configure the ABS measurement subframe according to ABS subframe configuration information of the interference neighboring cell of the UE, and configure the NonABS measurement subframe according to NonABS subframe configuration information of the interference neighboring cell of the UE.

For the base station, the configurator may be further configured to: if there are at least two interference neighboring cells of the UE, configure the ABS measurement subframe according to intersection configuration information of ABS subframes of the at least two interference neighboring cells of the UE, and configure the NonABS measurement subframe according to intersection configuration information of NonABS subframes of the at least two interference neighboring cells of the UE.

For the base station, the receiver may be further configured to receive, by means of an A3 event, the interference neighboring cell identifier of the UE sent by the UE.

For the base station, the inquirer may be further configured to query for prestored ABS configuration information of a neighboring cell according to the interference neighboring cell identifier of the UE, and obtain the ABS configuration information of the interference neighboring cell corresponding to the interference neighboring cell identifier.

For the base station, the inquirer may be further configured to: according to the interference neighboring cell identifier of the UE, by means of an X2 interface message exchange, obtain the ABS configuration information of the interference neighboring cell from a base station to which the interference neighboring cell corresponding to the interference neighboring cell identifier belongs.

For the base station, the receiver may be further configured to: receive a first CQI measurement result and a second CQI measurement result that are sent by the UE.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A base station, comprising:
a transceiver configured to receive an interference neighboring cell identifier of a user equipment (UE) sent by the UE; and
a processor configured to:
obtain almost blank subframe (ABS) configuration information according to the interference neighboring cell identifier of the UE, wherein the ABS configuration information is an ABS configuration of an interference neighboring cell corresponding to the interference neighboring cell identifier; and
configure an ABS measurement subframe and a non-almost blank subframe (NonABS) measurement subframe for the UE according to the ABS configuration information; and
wherein the transceiver is configured to send the ABS measurement subframe and the NonABS measurement subframe to the UE, wherein the ABS measurement subframe is used by the UE to perform first channel quality indicator (CQI) measurement and the NonABS measurement subframe is used by the UE to perform second CQI measurement.

2. The base station according to claim 1, wherein there is one interference neighboring cell of the UE, and the processor is further configured to:
configure the ABS measurement subframe according to ABS subframe configuration information of the one interference neighboring cell of the UE, and
configure the NonABS measurement subframe according to NonABS subframe configuration information of the one interference neighboring cell of the UE.

3. The base station according to claim 1, wherein there are at least two interference neighboring cells of the UE, and the processor is further configured to:
configure the ABS measurement subframe according to intersection configuration information of ABS subframes of the at least two interference neighboring cells of the UE, and
configure the NonABS measurement subframe according to intersection configuration information of NonABS subframes of the at least two interference neighboring cells of the UE.

4. The base station according to claim 1, wherein the transceiver is configured to receive the interference neighboring cell identifier of the UE sent by the UE in an A3 event.

5. The base station according to claim 1, wherein the processor is configured to
query for prestored ABS configuration information of a neighboring cell according to the interference neighboring cell identifier of the UE, and
obtain the ABS configuration information of the interference neighboring cell corresponding to the interference neighboring cell identifier.

6. The base station according to claim 1, wherein the processor is configured to:
according to the interference neighboring cell identifier of the UE, obtain the ABS configuration information of the interference neighboring cell from a base station to which the interference neighboring cell corresponding to the interference neighboring cell identifier belongs in an X2 interface message exchange.

7. The base station according to claim 1, wherein the transceiver is configured to:
receive a first CQI measurement result and a second CQI measurement result that are sent by the UE.

8. A method for configuring a channel quality indicator (CQI) measurement subframe, comprising:
receiving an interference neighboring cell identifier of a user equipment (UE) sent by the UE;
obtaining almost blank subframe (ABS) configuration information according to the interference neighboring cell identifier of the UE, wherein the ABS configuration information is an ABS configuration of an interference neighboring cell corresponding to the interference neighboring cell identifier;
configuring an ABS measurement subframe and a non-almost blank subframe (NonABS) measurement subframe for the UE according to the ABS configuration information of the interference neighboring cell of the UE; and sending the ABS measurement subframe and the NonABS measurement subframe to the UE, wherein the ABS measurement subframe is used by the UE to perform first CQI measurement and the NonABS measurement subframe is used by the UE to perform second CQI measurement.

9. The method according to claim 8, wherein there is one interference neighboring cell of the UE, and configuring the ABS measurement subframe and the NonABS measurement subframe for the UE comprises:

configuring the ABS measurement subframe according to ABS subframe configuration information of the one interference neighboring cell of the UE, and configuring the NonABS measurement subframe according to NonABS subframe configuration information of the one interference neighboring cell of the UE.

10. The method according to claim 8, wherein there are at least two interference neighboring cells of the UE, and configuring the ABS measurement subframe and the NonABS measurement subframe for the UE comprises:

configuring the ABS measurement subframe according to intersection configuration information of ABS subframes of the at least two interference neighboring cells of the UE, and configuring the NonABS measurement subframe according to intersection configuration information of NonABS subframes of the at least two interference neighboring cells of the UE.

11. The method according to claim 8, wherein receiving the interference neighboring cell identifier of the UE comprises:

receiving the interference neighboring cell identifier of the UE sent by the UE in an A3 event.

12. The method according to claim 8, wherein obtaining the ABS configuration information comprises:

querying for prestored ABS configuration information of a neighboring cell according to the interference neighboring cell identifier of the UE, and obtaining the ABS configuration information of the interference neighboring cell corresponding to the interference neighboring cell identifier.

13. The method according to claim 8, wherein obtaining the ABS configuration information comprises:

according to the interference neighboring cell identifier of the UE, obtaining the ABS configuration information of the interference neighboring cell from a base station to which the interference neighboring cell corresponding to the interference neighboring cell identifier belongs in an X2 interface message exchange.

14. The method according to claim 8, further comprising: receiving a first CQI measurement result and a second CQI measurement result that are sent by the UE.

15. A user equipment (UE), comprising:

a transmitter configured to send an interference neighboring cell identifier of the UE to a base station; and a receiver configured to receive an almost blank subframe (ABS) measurement subframe and a non-almost blank subframe (NonABS) measurement subframe from the base station, wherein the ABS measurement subframe is used by the UE to perform first channel quality indicator (CQI) measurement and the NonABS measurement subframe is used by the UE to perform second CQI measurement, wherein the ABS configuration information is an ABS configuration of an interference neighboring cell corresponding to the interference neighboring cell identifier of the UE.

16. The UE according to claim 15, wherein there is one interference neighboring cell of the UE, and wherein:

the ABS measurement subframe is configured according to ABS subframe configuration information of the one interference neighboring cell of the UE, and the NonABS measurement subframe is configured according to NonABS subframe configuration information of the one interference neighboring cell of the UE.

17. The UE according to claim 15, wherein there are at least two interference neighboring cells of the UE, and wherein:

the ABS measurement subframe is configured according to intersection configuration information of ABS subframes of the at least two interference neighboring cells of the UE, and the NonABS measurement subframe is configured according to intersection configuration information of NonABS subframes of the at least two interference neighboring cells of the UE.

18. The UE according to claim 15, wherein the transmitter is configured to transmit the interference neighboring cell identifier of the UE in an A3 event.

19. The UE according to claim 15, wherein the transmitter is configured to:

transmit a first CQI measurement result and a second CQI measurement result to the base station.

* * * * *